United States Patent Office 3,824,263
Patented July 16, 1974

3,824,263
PROCESS FOR THE PRODUCTION OF
ALKYLENEGLYCOL ESTERS
Wilfried Umbach, Langenfeld, and Werner Stein, Erkrath-Unterbach, Germany, assignors to Henkel & Cie GmbH, Dusseldorf, Germany
No Drawing. Continuation-in-part of abandoned application Ser. No. 889,753, Dec. 31, 1969. This application Aug. 17, 1972, Ser. No. 281,432
Claims priority, application Germany, Jan. 14, 1969, P 19 01 535.1
Int. Cl. C07c 67/00
U.S. Cl. 260—410.6
8 Claims

ABSTRACT OF THE DISCLOSURE

In the process of producing an alkyleneglycol ester of organic carboxylic acid which comprises reacting a higher organic carboxylic acid with an alkylene oxide in the presence of an oxyalkylation catalyst under oxyalkylation conditions and recovering said alkylene glycol ester, the improvement which comprises using a high molecular weight amine-oxide or a diamine dioxide as said oxyalkylation catalyst in the reaction of a higher organic carboxylic acid with the alkylene oxide.

CROSS REFERENCE TO RELATED APPLICATION

This application is a continuation-in-part of copending application Ser. No. 889,753, filed Dec. 31, 1969, and now abandoned.

THE PRIOR ART

It is known that the prior art processes of oxyalkylation of carboxylic acids carried out in the presence of basic oxyalkylation catalysts are generally not suitable for the preparation of the mono-esters of alkyleneglycols, since the diester formation is promoted both (1) from the alkyleneglycol carboxylic acid mono-esters and unreacted carboxylic acid present, and also (2) by rearrangement of the alkyleneglycol carboxylic acid mono-esters formed to diesters and polyalkyleneglycol. It has therefore already been proposed to use other catalysts in the process of oxyalkylation of carboxylic acids. The U.S. Patent Specification No. 2,910,490 describes a process for the preparation of alkyleneglycol carboxylic acid mono-esters by reacting carboxylic acids with alkylene oxides using ammonium halides as catalysts. In the German Auslegeschrift 1,248,660, thioethers are proposed as catalysts for the same purpose. From the Dutch Patent Application No. 6614650 the use of sulfoxides and from the German Auslegeschrift Nos. 1,154,479 and 1,157,623 the use of aqueous carboxylic acid amides as catalysts for the said reaction is known.

With reference particularly to the use of the alkyleneglycol carboxylic acid mono-esters as starting substances for the preparation of surface-active compounds of the sulfate type, the said catalysts have disadvantages which make their separation necessary. Thioethers and sulfoxides have, and give on oxyalkylation, an unpleasant odor. Ammonium halides, especially those with relatively long alkyl residues, form undesired neutral salts in admixture with anionic surface-active compounds. Finally, carboxylic acid amides may lead to trouble during the oxyalkylation process, since they begin to hydrolyze at a temperature of about 100° C. and can also give rise to side reactions.

In U.S. Pat. 3,360,545 it is known to prepare bis(hydroxyalkyl) fumarates by the catalyzed reaction of alkylene oxides with fumaric acid in a solvent with the reaction run until a product having an acid number of preferably five to fifteen is obtained. The oxyalkylation catalyst is selected from a group of basic catalysts including low molecular weight amine oxides, such as trimethylamine oxide. A disadvantage of this process is that if the reaction is not terminated at the proper time and if the reaction therefore continues until the acid number of the product drops below about five, then a large amount of alkylene glycol bis(alkyl fumarate) begins to form. The presence of alkylene glycol bis(alkyl fumarate) renders the product blend unsuitable for subsequent use as a monomer in polymerization reactions, since it causes undesirable crosslinking reactions.

From U.S. Pat. 3,481,973 it is known to prepare alkyl hydroxyalkyl fumarates by the catalyzed reaction of alkylene oxides with alkyl hydrogen fumarates, in which the oxyalkylation catalyst is selected from a group of nucleophilic catalysts including heterocyclic amine oxides, such as pyridine N-oxide, and low molecular weight alkylamine oxides, such as trimethylamine N-oxide, triethylamine N-oxide, and tripropylamine N-oxide. The reaction is run until a product having an acid number no lower than two is obtained. A disadvantage of this process is that if the reaction is not terminated at the proper time and if the reaction therefore continues until the acid number of the product drops below about two, then a large amount of alkylene glycol bis(alkyl fumarate) begins to form. The alkylene glycol bis(alkyl fumarate) renders the product blend unsuitable for subsequent use as a monomer in polymerization reactions, since it causes undesirable crosslinking reactions.

OBJECTS OF THE INVENTION

It is an object of the present invention to provide a process for the oxyalkylation of higher carboxylic acids utilizing as the oxyalkylation catalyst certain amine-oxides or diamine-dioxides, such that products are obtained with very low amounts of polyalkylene glycol and diester formation and with high amounts of monoester formation, which products can be directly sulfated without isolation of the catalyst.

It is another object of the present invention to provide a development in the process of producing an alkylene glycol ester of an organic carboxylic acid which comprises reacting an organic carboxylic acid with an alkylene oxide in the presence of an oxyalkylation catalyst under oxyalkylation conditions and recovering said alkylene glycol ester, the improvement which consists of reacting an organic carboxylic acid having from 6 to 26 carbon atoms with an alkylene oxide in the presence of an amine-oxide oxyalkylation catalyst having the formula

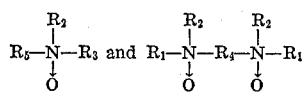

wherein $R_1$ and $R_2$ are selected from the group consisting of alkyl having from 1 to 24 carbon atoms, $R_3$ is lower alkyl, $R_4$ is alkylene having from 2 to 24 carbon atoms and $R_5$ is alkyl having 8 to 24 carbon atoms.

These and other objects of the invention will become apparent as the description thereof proceeds.

DESCRIPTION OF THE INVENTION

The present invention is directed to a development in the process of producing an alkylene glycol ester of an organic carboxylic acid which comprises reacting an organic carboxylic acid with an alkylene oxide in the presence of an oxyalkylation catalyst under oxyalkylation conditions and recovering said alkylene glycol ester, the improvement which consists of reacting an organic carboxylic acid having from 6 to 26 carbon atoms with an alkylene oxide in the presence of an amine-oxide oxyalkylation catalyst having the formula

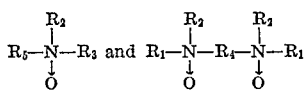

wherein $R_1$ and $R_2$ are selected from the group consisting of alkyl having from 1 to 24 carbon atoms, $R_3$ is lower alkyl, $R_4$ is alkylene having from 2 to 24 carbon atoms and $R_5$ is alkyl having 8 to 24 carbon atoms.

An improvement in the process of oxyalkylation of carboxylic acids has now been discovered. This improvement comprises utilizing a carboxylic acid of 6 to 26 carbon atoms as the fatty acid reactant and utilizing a high molecular weight amine oxide or diamine dioxide as the oxyalkylation catalyst. The use of this amine-oxide or diamine dioxide catalyst results in production of alkyleneglycol esters of higher organic carboxylic acid containing from 80% to 99% of monoesters, based on the alkyleneglycol, without resulting in the production of a polyglycol reaction product.

The amine-oxide catalysts of the invention are oxides of tertiary amines which may be cyclic and may be depicted by the formula

wherein the R's represent aliphatic residues preferably with from 1 to 24 carbon atoms, cycloaliphatic, heterocyclic and/or aromatic residues as well as corresponding di- and polyfunctional amine-oxide in which the amine-oxide groupings are linked by divalent aliphatic residues with preferably 1 to 24 carbon atoms, cycloaliphatic, heterocyclic and/or aromatic residues, and also mono- and poly-functional amine-oxide in which the amine-oxide grouping is a member of a saturated or unsaturated heterocyclic ring system, with the proviso that at least one of the R's has at least 6 carbon atoms.

All residues linked to the amine-oxide-nitrogen atom may carry substituents which have no detrimental effect on the alkoxylation reaction, for example halogen or ether groups.

Among the preferred amine-oxides are those of the formula:

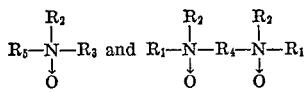

wherein $R_1$ and $R_2$ are selected from the group consisting of alkyl having from 1 to 24 carbon atoms, $R_3$ is lower alkyl, $R_4$ is alkylene having from 2 to 24 carbon atoms and $R_5$ is alkyl having 8 to 24 carbon atoms.

Examples of amine-oxides utilizable according to the invention include: dimethyldodecylamine-oxide, dimethyloctadecylamine-oxide, dioctadecylmethylamine-oxide, N,N,N',N'-tetramethylethylenediamine-dioxide, N,N,N',N'-tetramethyldodecamethylenediamine-dioxide. Amine-oxides are preferably used which contain at least one aliphatic residue with 8 to 24 carbon atoms and therefore may have detergent properties.

The amine-oxides to be used as catalysts according to the invention can be prepared in the known way, for example by reacting corresponding mono- and polytertiary amines with hydrogen peroxide in aqueous solution.

The amine-oxides may be present in the oxyalkylation reaction both in anhydrous form and in the form of an aqueous paste, such as is formed in the known method of preparation.

Since the said catalysts as described above may remain in the end product, the amount of catalyst to be used is not critical and may vary within wide limits. A proportion of from 1% to 5% by weight of amine-oxide, based on the higher carboxylic acid used, is generally sufficient for carrying out the reaction. However, the proportion may also be chosen so that, after sulfating the products, a surface-active combination of amine-oxides and ester sulfates directly utilizable in practice is present, which in some respect, for example with reference to detergent action and skin compatibility, show more favorable properties than the ester sulfates alone. In liquid surface-active combinations the amine-oxides also act as regulators of viscosity.

The process, according to the invention, is applicable to higher mono- and poly-carboxylic acids, which may be saturated or unsaturated, straight or branched chain, aliphatic, cycloaliphatic, aromatic or heterocyclic with preferably 6 to 26 carbon atoms. Examples of such starting substances are alkanoic acids having 8 to 26 carbon atoms such as lauric acid, stearic acid, etc., alkenoic acids having from 8 to 24 carbon atoms, alkadienoic acids having from 8 to 24 carbon atoms, hydroxyalkenoic acids having from 8 to 24 carbon atoms, all such as may be obtained from natural fats and oils by saponification, as well as mixtures thereof, cycloalkylcarboxylic acids having from 6 to 24 carbon atoms, such as cyclohexanecarboxylic acid, phenylcarboxylic acids having from 7 to 24 carbon atoms such as benzoic acid, terephthalic acid, etc., alkanedioic acids having from 8 to 24 carbon atoms such as octanedioic, etc., and dimeric and oligomeric fatty acids having from 24 to 56 carbon atoms as obtained by polymerization of unsaturated higher fatty acids. In addition to the above, mixtures of higher organic carboxylic acids as obtained by oxidation of hydrocarbons and carbonylation of olefinic or acetylenic hydrocarbon by known processes may be utilized.

The alkylene oxides utilized in the process are vicinal alkylene oxides having from 2 to 4 carbon atoms of the formula

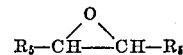

wherein $R_5$ is a member selected from the group consisting of hydrogen, methyl, ethyl, halomethyl and hydroxymethyl, for example ethylene oxide, propylene oxide, butylene oxide, epichlorhydrin or glycide.

The alkylene oxides are used in substantially the stoichiometric amounts, that is, $n$ mol of epoxide are used per mol of $n$-valent higher carboxylic acid. However, a small excess of epoxide may be advantageous.

The reaction of the higher carboxylic acids with the epoxides may be carried out under the usual conditions for oxyalkylation processes. Consequently, temperatures between 20° C. and 200° C., preferably between 40° C. and 100° C. may be used, and the process may be carried out both at normal pressures and, e.g. in an autoclave, under a slightly increased pressure.

The use of a solvent is generally unnecessary. In some cases, however, for example in the reaction of high-melting carboxylic acids, the use of a solvent usual for oxyalkylation reactions, for example diethyleneglycoldimethyl ether or dioxan, may be of advantage.

In order to carry out the reaction, to the higher organic carboxylic acid or, in certain cases, the higher carboxylic acid-solvent mixture, is added the required amount of catalyst, the subsequent mixture is heated to the desired reaction temperature and, after driving the air out of the reaction vessel, the calculated amount of alkylene oxide is added in liquid or gaseous form. The reaction products obtained are water-white and have mono-ester contents between 80% and 99%. The remaining 20% to 1% consists of some unreacted carboxylic acid and diester.

It is not necessary to terminate the reaction before the acid number of the product drops below about five, as in U.S. Pat. 3,360,545; or before the acid number of the product drops below two, as in U.S. Pat. 3,481,973. Polyglycol is practically absent from the products. The determination of the contents of mono-ester, diester and polyglycol is effected according to the directions given by Malkemus and Swan in the Journal of the American Oil Chemists' Society, 34, pages 342 onwards. Owing to the high mono-ester content and the fact that the amide-oxides used as catalysts can remain in the reaction mixture without causing trouble, working up of the products of the process is generally unnecessary.

When low molecular weight amine oxides such as trimethylamine-oxide are employed, even with higher molecular weight carboxylic acids, an unduly high amount of diesters are formed, as compared with the use of the higher molecular weight amine-oxides. In addition, when lower carboxylic acids are alkoxylated, even with the higher molecular weight amine oxide catalysts, again high amounts of unwanted diesters are formed, along with higher amounts of unwanted polyalkylene glycols.

The following specific embodiments are illustrative of the practice of the invention without being deemed limitative in any respect.

EXAMPLE 1

200 gm. (1 mol) of lauric acid were placed in an autoclave of 5 liters capacity and 4 gm. (2% by weight) of anhydrous trimethylamine-oxide were added thereto. The air in the autoclave was removed by flushing with nitrogen. After the contents of the autoclave had been heated to 70° C., a total of 44 gm. (1 mol) of ethylene oxide was introduced from a stock vessel by the aid of nitrogen at a pressure between 0.8 and 9 atmospheres. During the reaction the temperature remained between 70° C. and 80° C. The measured quantity of ethylene oxide introduced was absorbed in the course of 3.5 hours. The resulting product was waterwhite and contained 87.4% by weight of mono-ester, 9.0% by weight of diester and 3.6% by weight of unreacted lauric acid; polyethylene glycol was not detectable. (In calculating the data for the composition of the product, the content of catalyst was mathematically eliminated.)

EXAMPLES 2 TO 14

The procedures relating to the examples summarized in the following Table I were carried out as in Example 1. 1 mol of carboxylic acid was used in each case. In all the data for the composition of the end product, the content of catalyst was mathematically eliminated. In Examples 13 and 14 the analysis of the end product was effected respectively, spectrographically by nuclear magnetic resonance and by distillation.

The advantages attainable through the invention, in addition to the possibility of obtaining alkyleneglycol mono-esters of higher carboxylic acids in high yields, consist principally in that separation of the catalyst, and therefore in most cases working up of the reaction mixture can be omitted. The alkyleneglycol carboxylic acid mono-esters have, therefore, become available in a substantially more economic way, without containing any polyglycol.

When the products of the process are subsequently sulfated, the presence of amine-oxides has been found specially advantageous, since amine-oxides form adducts with the sulfating agent, for example $SO_3$ or chlorosulfonic acid, and therefore the reaction goes economically. The sulfation products show a better color quality, a high degree of sulfation and a low content of by-products because side reactions, such as ester exchange reactions which are known to be catalyzed by Lewis acids, are substantially eliminated. The amine-oxide sulfate adducts are split up again when the sulfation mixtures are neutralized with formation of the originally introduced amine-oxides.

The preceding specific embodiments are illustrative of the practice of the invention. It is obvious, however, that other expedients known to those skilled in the art may be employed without departing from the spirit of the invention or the scope of the appended claims.

We claim:

1. In the process of producing an alkylene glycol ester of an organic carboxylic acid which comprises reacting an organic carboxylic acid with an alkylene oxide in the presence of an oxyalkylation catalyst under oxyalkylation conditions and recovering said alkylene glycol ester, the improvement which consists of reacting an organic carboxylic acid having from 6 to 26 carbon atoms with an alkylene oxide in substantially the stoichiometric amounts and in the presence of an amine-oxide oxyalkylation catalyst selected from the group consisting of (A) an amine-oxide selected from the group consisting of dimethyldodecylamine - oxide, dimethyloctadecylamine-oxide, and dioctadecylmethylamine-oxide, and (B) an amine oxide having the formula

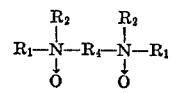

TABLE I

| Example No. | Carboxylic acid | Catalyst (percent wt.) in the end product | Reaction conditions ||||  Composition of the end product, percent ||||
|---|---|---|---|---|---|---|---|---|---|---|
| | | | Temp., °C. | Pressure, atm. | Time, hours | Mols and type of alkylene oxide added | Acid | Mono-ester | Di-ester | Poly-alkylene glycol |
| 2 | Lauric acid. | 1.9% dimethyldodecylamineoxide (anhydrous). | 75-76 | 0.7-8.1 | 11.5 | 1.1 ethylene oxide. | 0 | 94.4 | 5.6 | 0 |
| 3 | do | 2.0% dimethyldodecylamine oxide (85% aqueous paste). | 75-78 | 0.5-12.5 | 12.5 | 1.0 ethylene oxide. | 2.2 | 95.0 | 2.8 | 0 |
| 4 | do | 2.9% dimethyldodecylamine oxide (85% aqueous paste). | 75-78 | 0.8-10.0 | 6.5 | do | 0.4 | 98.7 | 0.9 | 0 |
| 5 | do | 2.0% dimethyloctadecylamine oxide (92% aqueous paste). | 72-78 | 0.6-11.6 | 11.3 | do | 2.9 | 95.0 | 2.1 | 0 |
| 6 | do | 2.0% dioctadecylmethylamine oxide (99% aqueous paste). | 82-85 | 0.5-11.0 | 4.8 | do | 6.7 | 88.4 | 4.9 | 0 |
| 7 | do | 2.0% N,N,N',N'-tetramethylethylenediaminedioxide (75% aqueous paste). | 65-77 | 0.6-10.8 | 8.2 | do | 2.0 | 93.4 | 4.6 | 0 |
| 8 | do | 2.0% N,N,N',N'-tetramethyldodecamethylenediamine dioxide (81% aqueous paste). | 73-78 | 0.6-11.3 | 7.2 | do | 1.9 | 93.8 | 3.5 | 0.8 |
| 9 | do | 2.9% dimethyldodecylamine oxide (85% aqueous paste). | 78-84 | 0.7-13.0 | 7.9 | 1.0 propylene oxide. | 2.9 | 97.1 | 0 | 0 |
| 10 | Stearic acid | 2.9% dimethyldodecylamine oxide (85% aqueous paste). | 80-83 | 0.5-10.0 | 6.5 | do | 0 | 100 | 0 | 0 |
| 11 | Benzoic acid | 2.9% dimethyldodecylamine oxide (85% aqueous paste). | 70-80 | 0.5-9.0 | 8.3 | 1.0 ethylene oxide. | 5.0 | 93.2 | 0 | 1.8 |
| 12 | Fish oil acid (acid No. 201.8, Iodine No. 140.1). | 2.9% dimethyldodecylamine oxide (85% aqueous paste). | 73-80 | 0.6-13.0 | 14.7 | 1.0 butylene oxide. | 3.4 | 95.5 | 0 | 1.1 |
| 13 | Glutaric acid. | 2.9% dimethyldodecylamine oxide (85% aqueous paste). | 74-100 | 0.6-9.5 | 8.3 | 2.0 ethylene oxide. | 3.0 | [1] 87.0 | [1] 9.0 | 1.0 |
| 14 | Acetic acid. | 2.9% dimethyldodecylamine oxide (85% aqueous paste). | 52-60 | 0.5-6.0 | 8.8 | 1.0 ethylene oxide. | 9.4 | 76.0 | 12.5 | 2.1 |

[1] Mono-ester / Diester } with reference to ethylene glycol.

wherein $R_1$ and $R_2$ are alkyl having from 1 to 24 carbon atoms, and $R_4$ is alkylene having from 2 to 24 carbon atoms, whereby the reaction products obtained have a mono-ester content of between 80% and 99%.

2. The process of claim 1, in which the amine-oxide is selected from the group consisting of N,N,N',N'-tetramethylethylenediamine-dioxide and N,N,N',N'-tetramethyldodecamethylenediamine-dioxide.

3. The process of claim 1 wherein said amine-oxide is present in an amount of at least 1% by weight, based on the weight of said organic carboxylic acid.

4. The process of claim 3 wherein said amine-oxide is present in an amount of from 1% to 5% by weight, based on the weight of said organic carboxylic acid.

5. The process of claim 1 wherein said organic carboxylic acid is selected from the group consisting of a fatty acid obtained from natural fats and oils by saponification and mixtures of the same.

6. The process of claim 1 wherein said alkylene oxide is selected from the group consisting of ethylene oxide, propylene oxide and butylene oxide.

7. The process of claim 1 wherein said organic carboxylic acid is selected from the group consisting of alkanoic acids having 8 to 26 carbon atoms, alkenoic acids having 8 to 24 carbon atoms, alkadienoic acids having from 8 to 24 carbon atoms, hydroxy-alkenoic acids having 8 to 24 carbon atoms, cycloalkyl carboxylic acids having 6 to 24 carbon atoms, phenylcarboxylic acids having 7 to 24 carbon atoms, and alkanedioic acids having 8 to 24 carbon atoms.

8. The process of claim 7 wherein the organic carboxylic acid is selected from the group consisting of lauric, stearic, and benzoic acids.

References Cited

UNITED STATES PATENTS

| 3,481,973 | 12/1969 | Wygant et al. | 260—485 |
| 3,360,545 | 12/1967 | Wygant | 260—485 |

LEWIS GOTTS, Primary Examiner

D. G. RIVERS, Assistant Examiner

U.S. Cl. X.R.

260—407, 468 R, 475 P, 476 R, 485 G, 496